(12) United States Patent
Harrison et al.

(10) Patent No.: US 12,067,052 B2
(45) Date of Patent: Aug. 20, 2024

(54) AIR PARTICULATE CLASSIFICATION

(71) Applicant: AlgoLook, Inc., Richardson, TX (US)

(72) Inventors: David E. Harrison, Frisco, TX (US);
Jeremy C. Patton, Sachse, TX (US);
John Dankovchik, Plano, TX (US)

(73) Assignee: Algolook, Inc., Richardson, TX (US)

( * ) Notice: Subject to any disclaimer, the term of this patent is extended or adjusted under 35 U.S.C. 154(b) by 491 days.

(21) Appl. No.: 17/133,330

(22) Filed: Dec. 23, 2020

(65) Prior Publication Data

US 2021/0207838 A1 Jul. 8, 2021

Related U.S. Application Data

(60) Provisional application No. 62/956,867, filed on Jan. 3, 2020.

(51) Int. Cl.
| | |
|---|---|
| G06F 16/732 | (2019.01) |
| G05B 13/02 | (2006.01) |
| G06F 18/243 | (2023.01) |
| G06N 3/08 | (2023.01) |
| G06N 5/04 | (2023.01) |
| G06N 20/00 | (2019.01) |
| G06T 5/50 | (2006.01) |
| G06V 10/96 | (2022.01) |
| G06V 20/40 | (2022.01) |

(Continued)

(52) U.S. Cl.
CPC ..... *G06F 16/7335* (2019.01); *G05B 13/0265* (2013.01); *G06F 18/24323* (2023.01); *G06N 3/08* (2013.01); *G06N 5/04* (2013.01); *G06N 20/00* (2019.01); *G06T 5/50* (2013.01); *G06V 10/96* (2022.01); *G06V 20/41* (2022.01); *G06V 20/46* (2022.01); *G06V 20/52* (2022.01); *G06V 20/64* (2022.01); *G06V 40/166* (2022.01); *G06V 40/172* (2022.01); *H04N 5/33* (2013.01); *H04N 23/611* (2023.01); *F24F 11/63* (2018.01); *G01J 2005/0077* (2013.01); *G01J 5/48* (2013.01); *G06F 16/252* (2019.01); *G06T 2207/10028* (2013.01); *G06T 2207/30201* (2013.01); *G06V 20/44* (2022.01)

(58) Field of Classification Search
CPC ........ G01M 99/00; G01F 1/86; G01F 23/804; G05B 23/0283
See application file for complete search history.

(56) References Cited

U.S. PATENT DOCUMENTS

| | | | | |
|---|---|---|---|---|
| 2002/0144537 | A1* | 10/2002 | Sharp | G01N 1/26 73/31.07 |
| 2008/0041138 | A1* | 2/2008 | Marra | B03C 3/12 73/31.02 |

(Continued)

OTHER PUBLICATIONS

Christopoulos et al., A machine learning approach to aerosol classification for single-particle mass spectrometry, 2018, Atmos. Meas. Tech., , p. 5687-5701. (Year: 2018).*

*Primary Examiner* — Kidest Bahta
(74) *Attorney, Agent, or Firm* — Ferguson Braswell Fraser Kubasta PC

(57) ABSTRACT

A method classifies air particulate data. Air sensor data is received from an air sensor. The air sensor data comprises a particulate vector. A machine learning model generates output from the air sensor data using a machine learning model. A notification that uses the machine learning model output is transmitted by a control system.

20 Claims, 11 Drawing Sheets

(51) Int. Cl.
*G06V 20/52* (2022.01)
*G06V 20/64* (2022.01)
*G06V 40/16* (2022.01)
*H04N 5/33* (2023.01)
*H04N 23/611* (2023.01)
*F24F 11/63* (2018.01)
*G01J 5/00* (2022.01)
*G01J 5/48* (2022.01)
*G06F 16/25* (2019.01)

(56) References Cited

U.S. PATENT DOCUMENTS

| | | | | |
|---|---|---|---|---|
| 2015/0052975 | A1* | 2/2015 | Martin | G01N 33/00 |
| | | | | 73/31.02 |
| 2019/0325334 | A1* | 10/2019 | Kuo | G08B 21/12 |

* cited by examiner

```
                    ┌─────────┐
                    │  START  │
                    └────┬────┘
                         ▼
    ┌────────────────────────────────────────┐
    │ TRAINING AN AEROSOL DETECTION MODEL TO │
    │ GENERATE AN AEROSOL CLASSIFICATION     │
    │ VECTOR FROM AIR SENSOR DATA USING      │
    │ TRAINING DATA AND AN UPDATE FUNCTION   │
    │ OF THE AEROSOL DETECTION MODEL         │
    │             STEP 252                   │
    └────────────────────┬───────────────────┘
                         ▼
    ┌────────────────────────────────────────┐
    │ GENERATING AN AEROSOL CLASSIFICATION   │
    │ VECTOR AS THE MACHINE LEARNING MODEL   │
    │ OUTPUT USING THE AEROSOL DETECTION     │
    │ MODEL AS A MACHINE LEARNING MODEL      │
    │             STEP 254                   │
    └────────────────────┬───────────────────┘
                         ▼
    ┌────────────────────────────────────────┐
    │ TRANSMITTING, BY AN AIR SENSOR SYSTEM  │
    │ COMPRISING AN AIR SENSOR THAT          │
    │ GENERATED THE AIR SENSOR DATA, THE     │
    │ AEROSOL CLASSIFICATION VECTOR TO THE   │
    │ CONTROL SYSTEM                         │
    │             STEP 256                   │
    └────────────────────┬───────────────────┘
                         ▼
    ┌────────────────────────────────────────┐
    │ TRANSMITTING, BY THE CONTROL SYSTEM,   │
    │ AN AEROSOL DETECTION NOTIFICATION AS   │
    │ THE NOTIFICATION IN RESPONSE TO        │
    │ RECEIVING THE AEROSOL CLASSIFICATION   │
    │ VECTOR FROM THE AIR SENSOR SYSTEM      │
    │             STEP 258                   │
    └────────────────────┬───────────────────┘
                         ▼
                    ┌─────────┐
   PROCESS 250 ────▶│   END   │
                    └─────────┘
```

*FIGURE 2B*

AIR PARTICULATE CLASSIFICATION

CROSS REFERENCE TO RELATED APPLICATIONS

This application claims priority to U.S. Provisional Application No. 62/956,867, filed on Jan. 3, 2020, which is hereby incorporated by reference herein.

BACKGROUND

Air sensors generate air sensor data that measures properties of air and includes values for the amount of particulate matter, temperature, humidity, pressure, etc. A challenge is to identify complex combinations of properties for the air measured with the sensor, including identifying the presence of specific aerosols, the quality of air, and properties of filters.

SUMMARY

In general, in one or more aspects, the disclosure relates to a method that classifies air particulate data. Air sensor data is received from an air sensor. The air sensor data comprises a particulate vector. A machine learning model generates output from the air sensor data using a machine learning model. A notification that uses the machine learning model output is transmitted by a control system.

In general, in one or more aspects, the disclosure relates to a system that includes a control system and a control application. The control system includes with one or more processors and one or more memories. The control application executes on one or more processors of the control system. Air sensor data is received from an air sensor. The air sensor data comprises a particulate vector. A machine learning model generates output from the air sensor data using a machine learning model. A notification uses the machine learning model output and is transmitted by the control system.

In general, in one or more aspects, the disclosure relates to a method that trains and uses machine learning models to classify air particulate data. A machine learning model is trained to generate a machine learning model output from air sensor data using training data and an update function of the machine learning model. The air sensor data is received from an air sensor. The air sensor data comprises a particulate vector. The machine learning model output is generated from the air sensor data using the machine learning model.

Other aspects of the invention will be apparent from the following description and the appended claims.

BRIEF DESCRIPTION OF DRAWINGS

FIG. 2A, FIG. 2B, and FIG. 2C show flowcharts in accordance with disclosed embodiments.

DETAILED DESCRIPTION

Figure 1A:
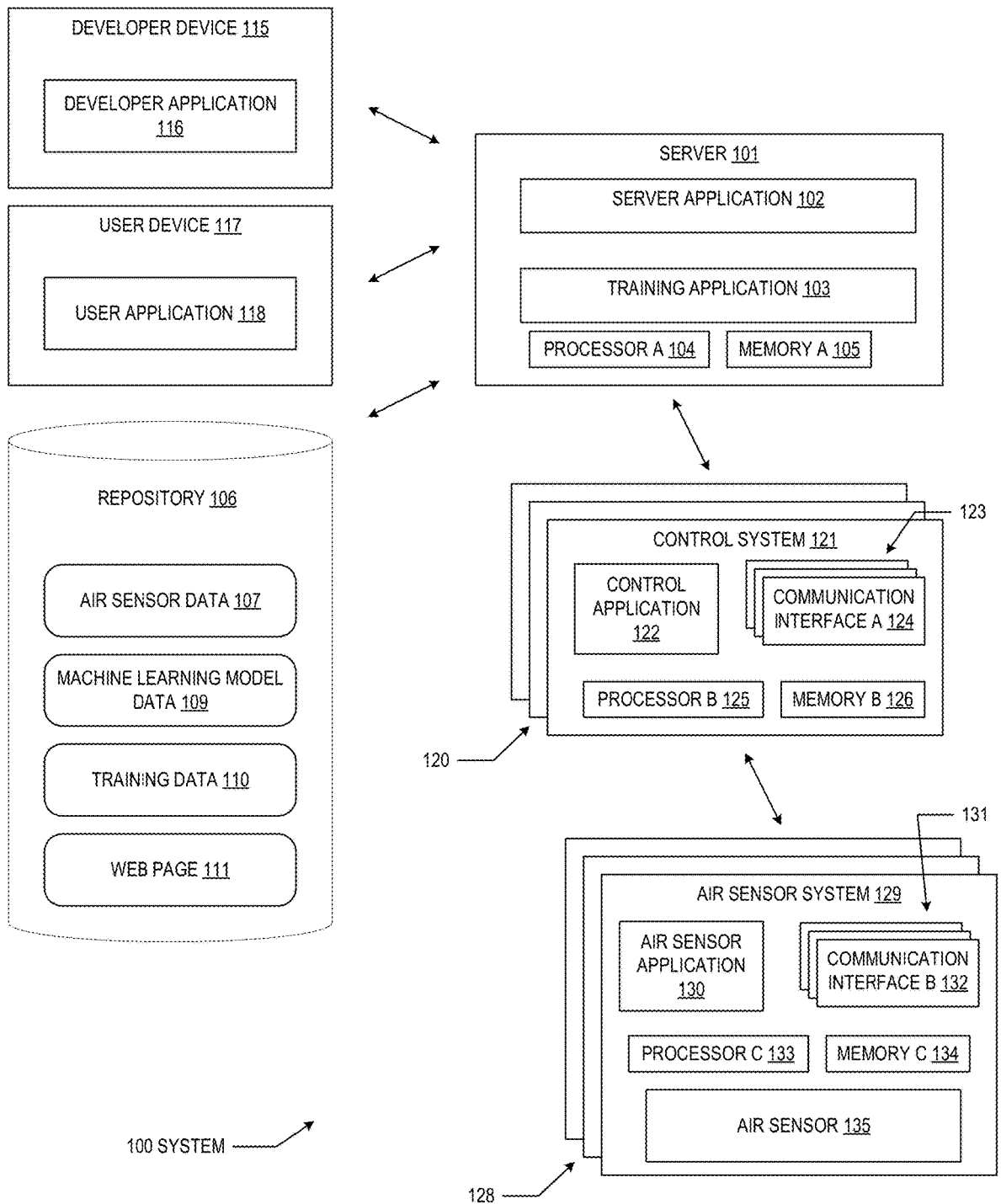
FIG. 1A, FIG. 1B, and FIG. 1C show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure train and use machine learning models to identify complex combinations of properties of air measured with air sensors. In one embodiment, the air sensor is part of a system that uses the air sensor data as an input to a machine learning model that identifies the type of aerosols present in the air. In one embodiment, air sensors may be placed before and after a filter and the machine learning model identifies properties of the air filter, including the filter exhaustion level.

Figure 1B:
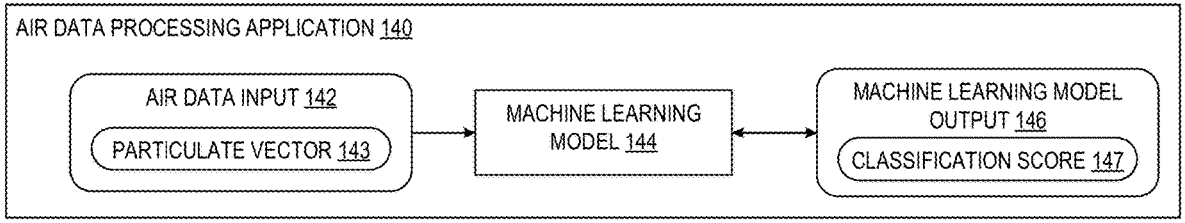
Figure 1C:
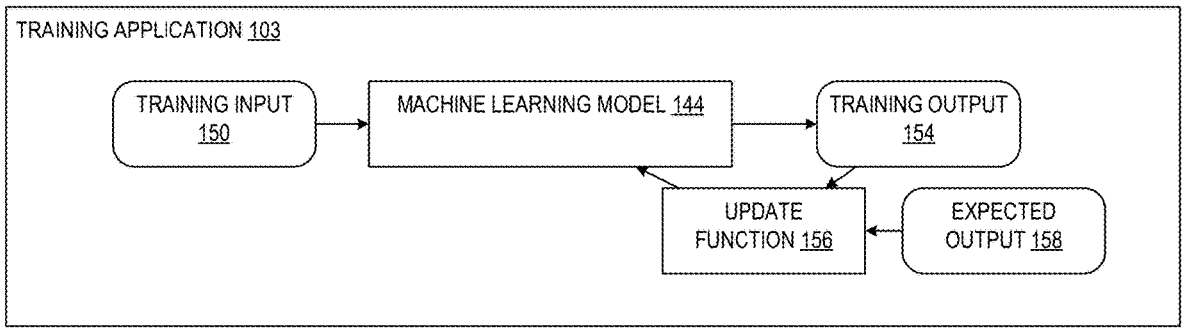

FIGS. 1A, 1B, and 1C show diagrams of embodiments that are in accordance with the disclosure. FIG. 1A shows the system (100), which trains and uses machine learning models to process air data. FIG. 1B shows the air data processing application (140), which uses machine learning models to process air data. FIG. 1C shows the training application (103), which trains machine learning models to process air data. The embodiments of FIGS. 1A, 1B, and 1C may be combined and may include or be included within the features and embodiments described in the other figures of the application. The features and elements of FIGS. 1A, 1B, and 1C are, individually and as a combination, improvements to the technology of machine learning. The various elements, systems, and components shown in FIGS. 1A, 1B, and 1C may be omitted, repeated, combined, and/or altered as shown from FIGS. 1A, 1B, and 1C. Accordingly, the scope of the present disclosure should not be considered limited to the specific arrangements shown in FIGS. 1A, 1B, and 1C.

Turning to FIG. 1A, the system (100) trains and uses machine learning models for air particulate detection. The system (100) includes the air sensor systems (128), the control systems (120), the server (101), the repository (106), the developer device (115), and the user device (117).

The air sensor systems (128) include the air sensor system (129), which is communicatively connected to the control system (121). The air sensor system (129) may be an embodiment of the computing system (500) and the nodes (522 and 524) of FIG. 5A and FIG. 5B. In one embodiment, the air sensor system (129) is implemented with a microcontroller board (for example, an Arduino Nano). The air sensor system (129) includes the air sensor application (130), the communication interfaces B (131), the processor C (133), the memory C (134), and the air sensor (135). The processor C (133) (which may include multiple processors) and the memory C (134) (which may include multiple memories) execute and store the programs that run on the air sensor system (129). The communication interfaces B (131), the processor C (133), the memory C (134) may be implemented with a microcontroller board.

The air sensor (135) measures the properties of air. The air sensor (135) may, periodically or responsively, transmit air data in a data structure that includes values for the properties of air being measured. In one embodiment, the air sensor (135) may measure or detect air temperature, air pressure, humidity, specific molecular compounds, and particulate matter. As an example, the molecular compounds may measured in parts per million and include carbon monoxide (CO), nitrogen dioxide (NO2), Ethanol (C2H6OH), hydrogen (H2), ammonia (NH3), methane (CH4), propane (C3H8), iso-butane (C4H), etc. The particulate matter may be measured by size using laser scattering. In one embodiment, a set of bins (e.g., 24) may be used to measure for particulate matter ranging from about 0.3 micrometers to about 45 micrometers. Particulate matter counts may also be provided, include PM1, PM2.5, PM10, etc. which identify the amount of particulate matter in a sample with sizes below 1 micron, 2.5 microns, 10 microns, etc. Below is an example of data from an air sensor structured using JavaScript object notation (JSON), which has air sensor data that also includes sensor identification data.

{
"nodeID": "001e063059c3",
"sensorID": "ALG1-P3-B280-G001",
"serialNumber": "Manufacturer Number 123",
"binCount0": 57,
"binCount1": 5,
"binCount2": 3,
"binCount3": 1,
"binCount4": 0,
"binCount5": 0,
"binCount6": 0,
"binCount7": 0,
"binCount8": 0,
"binCount9": 0,
"binCount10": 0,
"binCount11": 0,
"binCount12": 0,
"binCount13": 0,
"binCount14": 0,
"binCount15": 0,
"binCount16": 0,
"binCount17": 0,
"binCount18": 0,
"binCount19": 0,
"binCount20": 0,
"binCount21": 0,
"binCount22": 0,
"binCount23": 0,
"temperature": 28.656,
"humidity": 34.682,
"pm1": 3.16,
"pm2": 3.95,
"pm10": 3.98,
"temperatureBME": 26.18,
"pressureBME": 100551.0,
"humidityBME": 33.0,
"altitudeBME": 64.63,
"nh3": 0.07,
"co": 0.0,
"no2": 20.57,
"c3h8": 18.88,
"c4h10": 85524.39,
"ch4": 28034.24,
"h2": 192455.52,
"c2h5oh": 7.73
}

In one embodiment, exponential smoothing may be used on the data from the air sensor (135). For example, the values for each of the bins may be smoothed based on previous values for the same bin. In one embodiment, the smoothing may be accomplished using the equation below, where $v_{t0}$ is the smoothed value for one bin at the present time, $v_{t-1}$ is the previous smoothed value, a is a weighting factor, and $C_{t0}$ is the raw data value received from the air sensor (135).

$$V_{t0}=a*V_{t-1}+(1-a)*C_{t0} \qquad \text{Eq. 1}$$

As an example, when three readings are used ($V_{t-3}=0$), a=0.5, and the raw data readings of $C_{t-2}$, $C_{t-1}$, and Co are 1, 2, 3, then Equation 1 for the previous times becomes Equations 2 and 3 below.

$$v_{t-2}=(1-a)*C_{t-2} \qquad \text{Eq. 2}$$

$$V_{t-1}=a*V_{t-2}+(1-a)*C_{t-1} \qquad \text{Eq. 3}$$

Substituting Equations 2 and 3 into Equation 1 yields Equation 4 below. Equation 5 substitutes the values in for the variables and shows that the smoothed value is 2.25 for this example.

$$v_{to}=a*(a*(1-a)*C_{t-2})+(1-a)*C_{t-1})+(1-a)*C_{t0} \qquad \text{Eq. 4}$$

$$2.25=0.5*(0.5*((1-0.5)*1)+(1-0.5)*2)+(1-0.5)*3 \qquad \text{Eq. 5}$$

When the next raw data value is much higher, e.g., 20, the smoothed value is 11.125, as shown from Equation 6 below, which shows a spike in the bin variable.

$$11.125=0.5*2.25+(1-0.5)*20 \qquad \text{Eq. 6}$$

The air sensor (135) may be connected to one of the communication interfaces B (131) using a wired interface (e.g., a serial peripheral interface (SPI)). In one embodiment, the air sensor (135) may be directly connected to one of the communication interfaces A (123) of the control system (121) and bypass the air sensor system (129).

The air sensor application (130) operates in conjunction with the server application (102) and the control application (122) to process air data from the air sensor (135). The air sensor application (130) includes one more programs that are stored on the memory C (134) and execute on the processor C (133). The air sensor application (130) may receive air data from the air sensor (135), process the air data, store the air data, and transmit data from the air sensor system up to the control system (121) and server (101).

Processing the air data may include applying machine learning models and mathematical transformations to the air data from the air sensor (135). As an example, the processing may include applying a calibration model to their data. In one embodiment, the processing may include generating periodic average values for the air data from the air sensor (135).

The communication interfaces B (131) connect the air sensor system (129) to the control system (121) and to the air sensor (135). The communication interfaces B (131) may utilize different wired or wireless communication interfaces to connect with the control system (121) and the air sensor (135). For example, the communication interface B (132) may be a universal serial bus (USB) interface that connects to the communication interface A (124) of the control system (121) and the communication interfaces B (131) may include a serial peripheral interface that connects to the air sensor (135).

The control systems (120) include the control system (121). The control system (121) may be an embodiment of the computing system (500) and the nodes (522 and 524) of FIG. 5A and FIG. 5B. In one embodiment, the control system (121) is implemented with a small form factor single board computer (for example, an ODROID-XU4). The control system (121) connects between the air sensor system (129) and the server (101). In one embodiment, the control system (121) may be connected to multiple air sensor systems of the air sensor systems (128). The control system (121) includes the control application (122), the communication interfaces A (123), the processor B (125), and the memory B (126). The processor B (125) (which may include multiple processors) and the memory B (126) (which may include multiple memories) execute and store the programs that run on the control system (121). The communication interfaces A (123), the processor B (125), and the memory B (126) may be implemented with a microcontroller board.

The control application (122) operates in conjunction with the server application (102) and the air sensor application (130) to process air data from the air sensor (135). The control application (122) includes one or more programs that are stored on the memory B (126) and executed on the processor B (125). The control application (122) may receive, process, store, and transmit data. For example, the control application (122) may receive data from the air sensor system (129), process and store the data, and transfer the data to the server (101).

The communication interfaces A (123) connect the control system (121) to the server (101) (through a network) and to the air sensor system (129). The communication interfaces A (123) may utilize different wired or wireless communication interfaces. For example, the communication interface A (124) may be a universal serial bus (USB) interface that connects to the communication interface B (132) of the air sensor system (129). The communication interfaces A (123) may also include a wired or wireless network adapter that connects to the server (101) through an intranet and the internet.

Figure 5A:
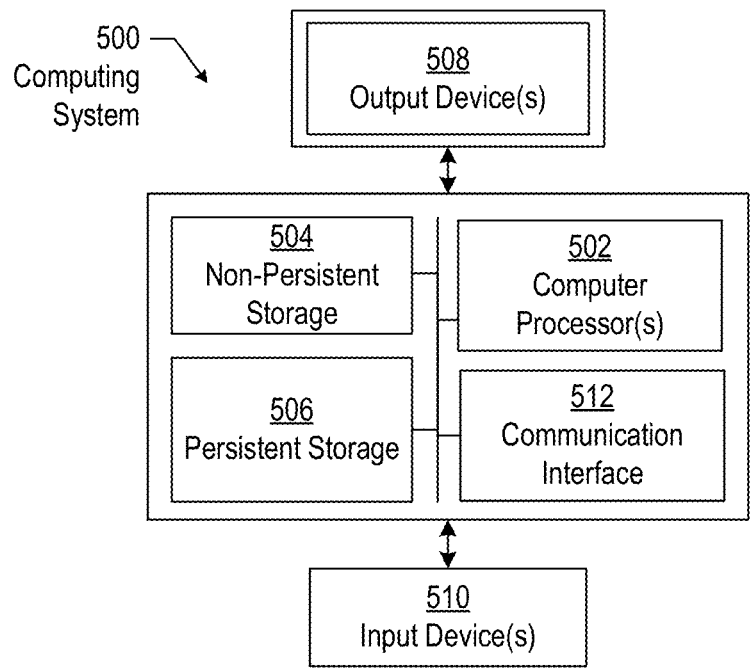
FIG. 5A and FIG. 5B show computing systems in accordance with disclosed embodiments.
Figure 5B:
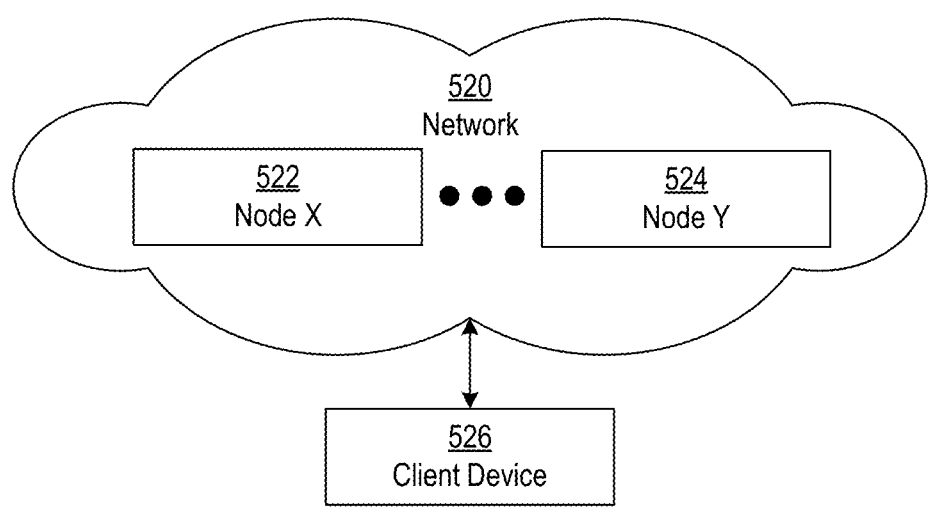

The server (101) is an embodiment of the computing system (500) and the nodes (522 and 524) of FIG. 5A and FIG. 5B. The server (101) may be one of a set of virtual machines hosted by a cloud services provider to deploy the training application (103) and the server application (102). The server (101) includes the processor A (104) (which may include multiple processors) and the memory A (105) (which may include multiple memories) that execute and store the applications of the server (101). Each of the programs running on the server (101) may execute inside one or more containers hosted by the server (101).

The server application (102) is a program on the server (101). The server application (102) includes multiple programs used by the system (100) to interact with the user device (117), present data to a user of the user device (117). In one embodiment, the server application (102) may deploy machine learning models (stored in the machine learning model data (109) in the repository (106)) to the control systems (120) and to the air sensor systems (128). In one embodiment, the server application (102) may collect data from the control systems (120) and the air sensor systems (128), which may be generated by the air sensors of the air sensor systems (129) (including the air sensor 135).

The training application (103) is a program on the server (101). The training application (103) trains the machine learning models using the machine learning model data (109) and the training data (110). The training application (103) may be operated or controlled by the developer device (115) with a developer application (116). The training application (103) is further described in FIG. 1C.

The repository (106) is a computing system that may include multiple computing devices in accordance with the computing system (500) and the nodes (522 and 524) of FIG. 5A and FIG. 5B. The repository (106) may be hosted by a cloud services provider. The cloud services provider may provide hosting, virtualization, and data storage services as well as other cloud services and to operate and control the data, programs, and applications that store and retrieve data from the repository (106). The data in the repository (106) may include the air sensor data (107), the machine learning model data (109), and the training data (110).

The air sensor data (107) is data received by the system (100) from the air sensors of the air sensor systems (128). The air sensor data (107) in the repository (106) may include raw data and may include processed data. For example, the raw data may include data transmitted directly from the air sensor (135) that is received by the server (101) and stored in the repository (106). The processed data may include data from the air sensors of the system (100) that have been processed, which may include average values, periodic values, standard deviations, etc.

The machine learning model data (109) may include the code and data that form the machine learning models used by the system (100). For example, the weights of neural network models and the rules of random forest models may be part of the machine learning model data (109).

The training data (110) is the data used to train the machine learning models of the system (100). The training data (110) may include pairs of training inputs and expected outputs and may also include the intermediate data generated to train and update the machine learning models of the system (100). The training inputs may be derived from the air sensor data (107) received from the air sensors of the system (100).

The data in the repository (106) may also include a web page (111) that is part of a website hosted by the system (100). The users and the developers may interact with the website using the user device (117) and the developer device (115) to access the server application (102) and the training application (103).

The developer device (115) is an embodiment of the computing system (500) and the nodes (522 and 524) of FIG. 5A and FIG. 5B. In one embodiment, the developer device (115) is a desktop personal computer (PC). The developer device (115) includes the developer application (116) for accessing the training application (103). The developer application (116) may include a graphical user interface for interacting with the training application (103) to control training and updating the machine learning models of the system (100).

The user device (117) is an embodiment of the computing system (500) and the nodes (522 and 524) of FIG. 5A and FIG. 5B. In one embodiment, the user device (117) is a desktop personal computer (PC), a smartphone, a tablet, etc. The user device (117) is used to access the web page (111) of the website hosted by the system (100). The user device (117) includes the user application (118) for accessing the server application (102). The user application (118) may include multiple interfaces (graphical user interfaces, application program interfaces (APIs)) for interacting with the server application (102). A user may operate the user application (118) to perform tasks with the server application (102) to interact with the system (100). The results may be presented by being displayed by the user device (117) in the user application (118). For example, the user application (118) may display air sensor data collected by the system (100).

The developer application (116) and the user application (118) may be web browsers or native applications that access the server application (102) and the training application (103) using web resources hosted by the server (101). The developer application (116) and the user application (118) may additionally be web services that communicate with the server application (102) and the training application (103) using representational state transfer application programming interfaces (RESTful APIs). Although FIG. 1C shows a client server architecture, one or more parts of the training application (103) and the server application (102) may be local applications on the developer device (115) and the user device (117) without departing from the scope of the disclosure.

Turning to FIG. 1B, The air data processing application (140) uses the machine learning model (144) to generate the machine learning model output (146) from the air data input (142). The air data processing application (140) may include, or be a part of, the air sensor application (130) (of FIG. 1A), the control application (122) (of FIG. 1A), and the server application (102) (of FIG. 1A).

The machine learning model (144) generates the machine learning model output (146) from the air data input (142). The machine learning model (144) may be a combination of multiple machine learning models. Within the machine learning model (144), the output of one model may be used as the input to another model. Machine learning algorithms used by the machine learning model (144) may include neural network algorithms, random forest algorithms, logistic regression algorithms, decision tree algorithms, K nearest neighbor algorithms, Stochastic gradient descent algorithms, kernel approximation algorithms, etc.

The air data input (142) is the input to the machine learning model (144). The air data input (142) may include data from the air sensor (135) (of FIG. 1A). The air data input (142) may include the particulate vector (143). In one embodiment, the particulate vector (143) includes the values from the bins used to measure particulate matter ranging from about 0.3 micrometers to about 45 micrometers. The particulate vector (143) may further include values for individual chemical compounds, humidity, temperature, pressure, etc.

A machine learning model output (146) is the output from the machine learning model (144). The machine learning model output (146) may include the classification score (147). The classification score (147) identifies a classification of the air data input (142).

In one embodiment, the classification score (147) may identify a particular type of aerosol (e.g., an aerosol from vape juice). The machine learning model output (146) may include multiple classification scores in a classification vector with each element of the classification vector mapped to a particular type of aerosol.

In one embodiment, the classification score (147) may identify an exhaustion level of a filter. The machine learning model output (146) may include multiple classification scores in a classification vector with each element of the classification vector mapped to a different exhaustion level. As an example, the exhaustion levels may be 10%, 50%, and 90%. and the classification vector may include three elements, one for each of the exhaustion levels. The exhaustion levels may indicate how much the filter has been used. For example, an exhaustion level of 50% may indicate that the filter has been used about half way and an exhaustion level of 90% may indicate that the filter has been mostly used and should be replaced. Additionally, intermediate percentages of filter exhaustion levels may be interpolated from the filter classification vector.

Turning to FIG. 1C, the training application (103) trains the machine learning model (144) used by the system (100) (shown in FIG. 1A). Each of the machine learning models that form the machine learning model (144) may be trained independently or collectively with each other. The machine learning model (144) takes the training input (150), generates the training output (154) from the training input (150), uses the update function (156) to compare the training output (154) to the expected output (158), and updates the machine learning model (144). The updates may be in accordance with or proportional to the errors observed between the training output (154) and the expected output (158) by the update function (156).

In one embodiment, the machine learning model (144) includes a neural network model that uses forward propagation to generate the training output (154) from the training input (150). The update function (156) uses backpropagation to update the weights of the neural network of the learning model (144) based on the error between the training output (154) and the expected output (158).

In one embodiment come the machine learning model (144) uses a random forest algorithm to generate a number of decision trees that vote or are averaged to generate the training output (154). Each decision tree may include a random selection of variables from the training input that are compared to a set of thresholds. Based on the accuracy of the result, the update function (156) may update the variables and thresholds in the decision trees of the random forest.

Figure 2A:
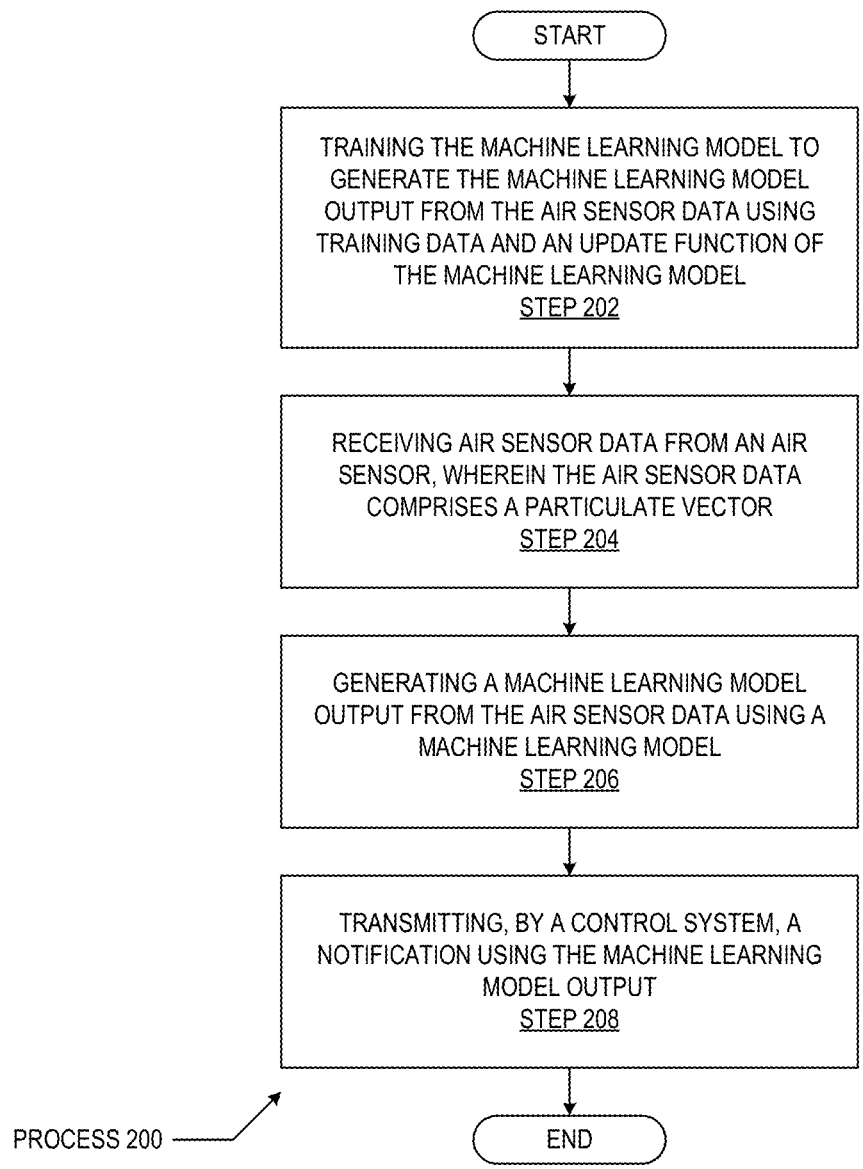
Figure 2C:
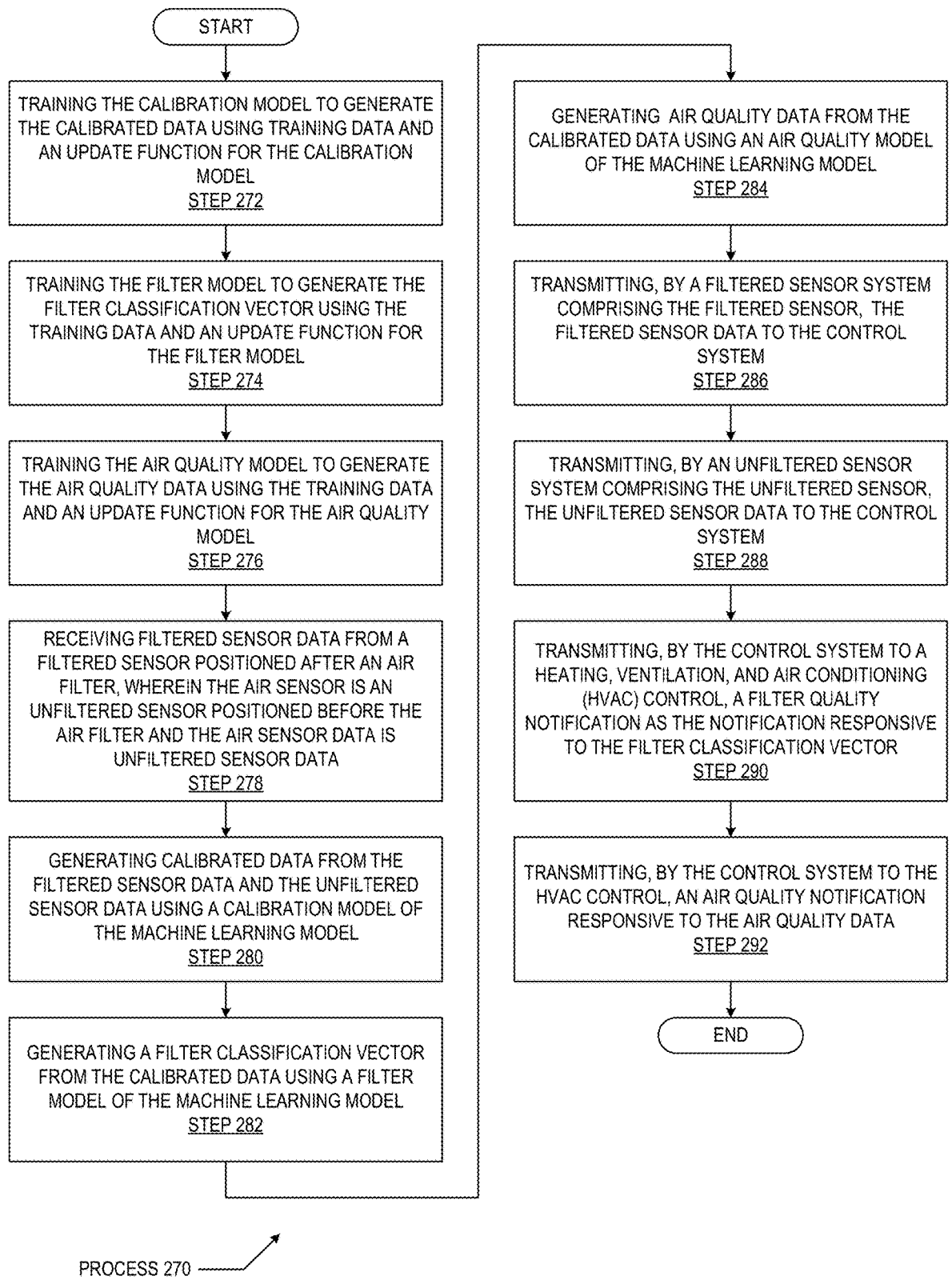

FIGS. 2A, 2B, and 2C show flowcharts of processes in accordance with the disclosure. The process (200) of FIG. 2A trains and uses machine learning models to perform air particulate classification. The process (250) of FIG. 2B trains and uses machine learning models to classify aerosols. The process (270) of FIG. 2C trains and uses machine learning models to classify filters. The embodiments of FIGS. 2A, 2B, and 2C may be combined and may include or be included within the features and embodiments described in the other figures of the application. The features of FIGS. 2A, 2B, and 2C are, individually and as an ordered combination, improvements to the technology of computing systems and machine learning systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the process (200) uses machine learning models to classify air sensor data. At Step 202, a machine learning model is trained to generate machine learning model output from air sensor data. The machine learning model is trained using training data and an update function of the machine learning model. The update function compares output form the machine learning model to expected output and adjusts the parameter so the machine learning model to reduce the error between the machine learning model output and the expected outputs.

At Step 204 air sensor data is received from an air sensor. The air sensor data may include particulate matter data in a particulate vector with elements that identify the number of particulates of a given size they were detected by the air sensor. The air sensor data may include additional values for temperature, humidity, pressure, the presence of molecular compounds, etc.

At Step 206, a machine learning model output is generated from the air sensor data using a machine learning model. The output may be a scalar value or a vector of values and may include a classification of the air sensor data.

At Step 208, a notification is transmitted by a control system using the machine learning model output. The notification may be transmitted periodically or in response to the machine learning model output. As an example, the machine learning model output may identify a certain classification for the air sensor data and in response to identifying the classification of the air sensor data, the notification may be transmitted. In one embodiment, the notification is a vape detection notification that identifies a type aerosol from the machine learning model output. In one embodiment, the notification is an air quality notification that identifies classification of air quality from the machine learning model output.

In one embodiment, the air sensor data and the machine learning model output may be periodically received by a server application from the control system. The server application may perform additional processing on the data received and send a notification based on the air sensor data.

Turning to FIG. 2B, the process (250) uses machine learning models to classify air sensor data. At Step 252, an aerosol detection model is trained to generate an aerosol classification vector from the air sensor data using training data and an update function of the aerosol detection model. In one embodiment, the aerosol detection model is a machine learning model that uses a neural network or random forest algorithm. The training data includes examples of inputs and expected outputs for the aerosol detection model. The inputs from the training data may include a historical air sensor data that was previously captured. The expected outputs from the training data includes labels for the historical air sensor data that identifies the type of aerosol present well the historical air sensor data was captured.

At Step 254, an aerosol classification vector is generated using an aerosol detection model. The aerosol classification vector is a machine learning model output that may identify the type of aerosol detected in the air sensor data. The aerosol classification vector may be referred to as a vape classification vector.

In one embodiment, the aerosol classification vector is a vector of prediction confidence scores for a set of aerosol identifiers. The elements of the vector may be mapped to the aerosol identifiers. The aerosol identifiers are unique identifiers for different aerosols, which may include vape juices.

At Step 256, the aerosol classification vector is transmitted to a control system. The aerosol classification vector may be transmitted by an air sensor system that includes an air sensor that generated the air sensor data used to generate the aerosol classification vector.

At Step 258, an aerosol detection notification is transmitted in response to receiving the aerosol classification vector from the air sensor system. The aerosol detection notification may be transmitted by the control system to a server.

Turning to FIG. 2C, the process (270) uses machine learning models to classify air sensor data. At Step 272, the calibration model is trained to generate the calibrated data using training data and an update function for the calibration model. In one embodiment, the calibration model is a machine learning model that uses a neural network or random forest algorithm. The training data includes unfiltered sensor data and filtered sensor data that is captured when the filter is removed from the system. With the filter removed, the air sensor data from the unfiltered air sensor (positioned before the location of the filter) and from the filter air sensor (positioned after the location of the filter) should be similar if not the same.

In one embodiment, one of the "unfiltered" air sensor data or the "filtered" sensor data may be used as the training input to the calibration model with the other may be used as the expected output (i.e., the "unfiltered" air sensor data may be the training input and the "filtered" air sensor data may be the expected output, or vice versa). The calibration model generates the training output from the training input (e.g., the "unfiltered" sensor data) and the update function compares the expected output (e.g., the "filtered" sensor data) to the training output and adjusts the parameters of the calibration model to reduce the error or difference between the training output at the expected output.

In one embodiment, the calibration model may take as input both the "unfiltered" sensor data (e.g., a 50 element vector) and the "filtered" sensor data (e.g., another 50 element vector) and output a combined vector (e.g., 100 element vector) that includes calibrated values for the "unfiltered" sensor data and the "filtered" sensor data. The update function of the calibration model may compare the two portions of the combined vector to determine the error between calibrated values for the "unfiltered" sensor data and the "filtered" sensor data and update the calibration model to minimize this error.

At Step 274, the filter model is trained to generate the filter classification vector using training data and an update function for the filter model. In one embodiment, the filter model is a machine learning model that uses a neural network or random forest algorithm. The training data may include historical calibrated data captured when a filter of known exhaustion level is used. For example, the system may be run with a filter that is known to be at or near 50% exhaustion level to record calibrated data that is paired with an expected output that indicates the level of exhaustion as being 50%. The same may be done for different exhaustion levels (e.g., 10%, 25%, 75%, 90%, etc.).

At Step 276, an air quality model is trained to generate the air quality data using training data and an update function for the air quality model. In one embodiment, the air quality model is a machine learning model that uses a neural network or random forest algorithm. The training data may include historical calibrated data captured when air of a known quality level is passed through the system. For example, The system may be run with a filter that is known to be at or near a cumulative air quality index ($C_{iaQ}$) of 50 to record calibrated data that is paired with an expected output that indicates the cumulative air quality index is 50. The same may be done for different cumulative air quality index levels (e.g., 30, 70, etc.).

At Step 278, unfiltered sensor data is received from an unfiltered sensor positioned before an air filter and filtered sensor data is received from a filtered sensor positioned after an air filter. The unfiltered sensor data and the filtered sensor data may use the same data structure that includes a particulate vector and values for levels (parts per million) of individual chemical compounds, humidity, temperature, pressure, etc.

At Step 280, calibrated data is generated from the filtered sensor data and the unfiltered sensor data using a calibration model of the machine learning model. As an example, the filtered sensor data and the unfiltered sensor data may each be formed as a 50 element vector (that includes a particulate vector and values for individual chemical compounds, humidity, temperature, pressure). The calibration model takes the filtered sensor data and the unfiltered sensor data as input and outputs the calibrated data, which may be a (100) element vector with calibrated values for each of the values generated from the two 50 element vectors input to the calibration model.

At Step 282, a filter classification vector is generated from the calibrated data using a filter model of the machine learning model. The filter classification vector may include a vector of prediction confidence scores for a set of filter exhaustion levels. For example, elements of the filter classification vector may be associated with an exhaustion level of the filter between the air sensors that provided the air sensor data to the system. In one embodiment, the filter classification vector may include three elements there are mapped to filter exhaustion levels of 10%, 50%, and 90% and each level may have an associated prediction confidence score generated by the filter model that identifies the confidence that the filter is presently at a certain exhaustion level.

At Step 284, air quality data is generated from the calibrated data using an air quality model of the machine learning model. The air quality data may include a cumulative air quality index ($C_{iaQ}$) (also referred to as an air quality index) that identifies the quality of the air after passing through the filter located between the air sensors that generate the air sensor data. The air quality index value may be mapped to a plurality of strings describing air quality based on the air quality index value. For example, a values from 0 to 30 may be mapped to the string "Air quality is good!", values from 30 to 50 may be mapped to the string "Air quality is average.", and values greater than 50 may be mapped to the string "Air quality is bad" (with values greater than 75 triggering an alarm in the system).

At Step 286, the filtered sensor data is transmitted to the control system. In one embodiment the filtered sensor system that includes the filtered sensor that generated the filtered sensor data transmits the filtered sensor data to the control system.

At Step 288, the unfiltered sensor data is transmitted to the control system. In one embodiment the unfiltered sensor system that includes the unfiltered sensor that generated the unfiltered sensor data transmits the unfiltered sensor data to the control system.

At Step 290, a filter quality notification is transmitted responsive to a filter classification vector. The filter quality notification may be transmitted by the control system to a heating, ventilation, and air conditioning (HVAC) control in response to the filter classification vector being generated by the control system.

At Step 292, an air quality notification is transmitted responsive to the air quality data. The air quality notification may be transmitted by the control system to the HVAC control.

Figure 3A:
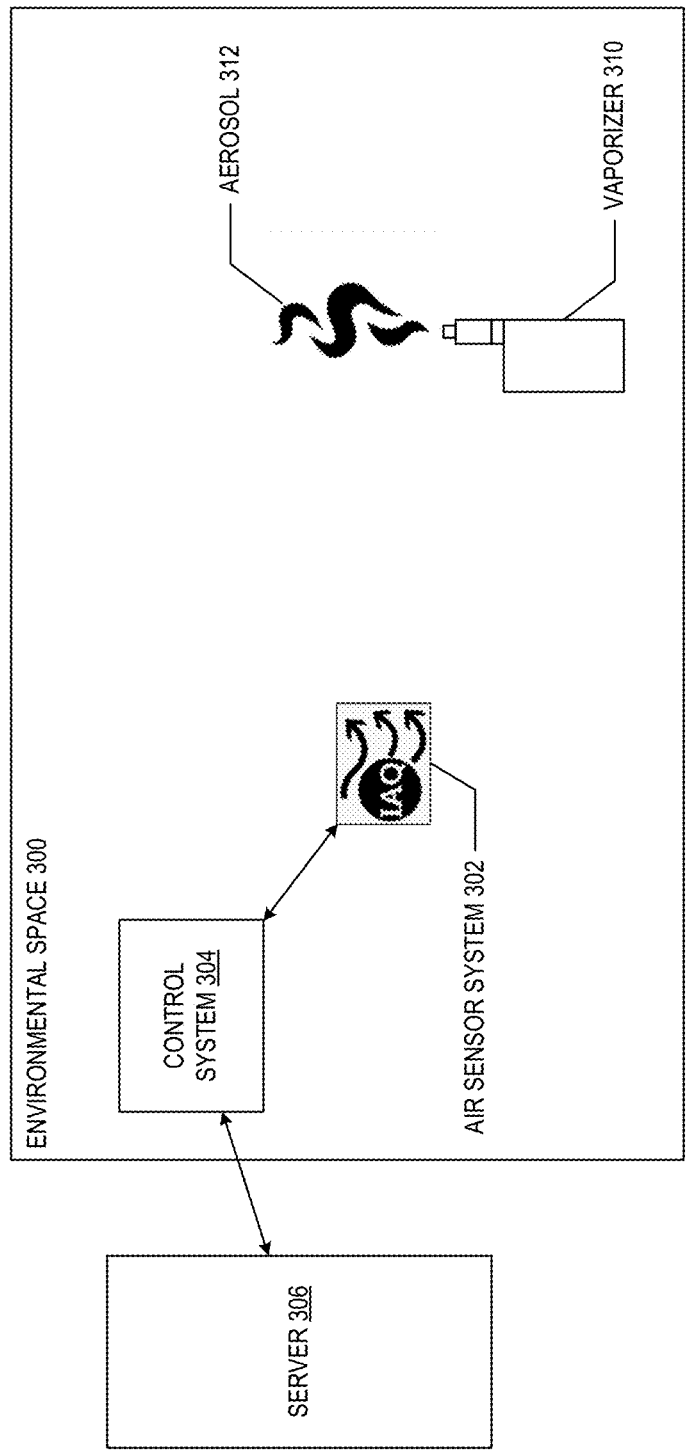
FIG. 3A, FIG. 3B, FIG. 3C, FIG. 4A, and FIG. 4B show examples in accordance with disclosed embodiments.
Figure 3B:
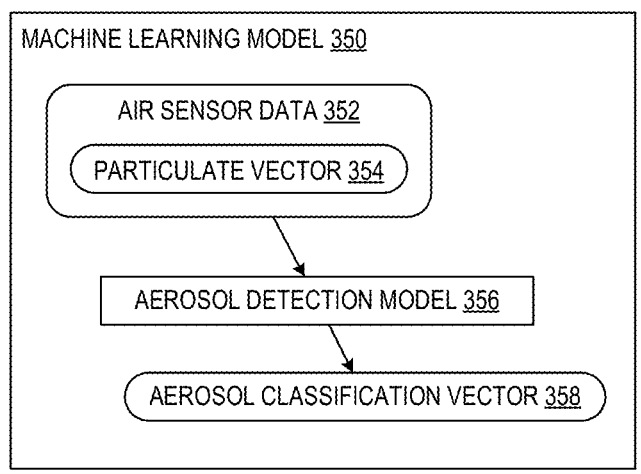
Figure 3C:
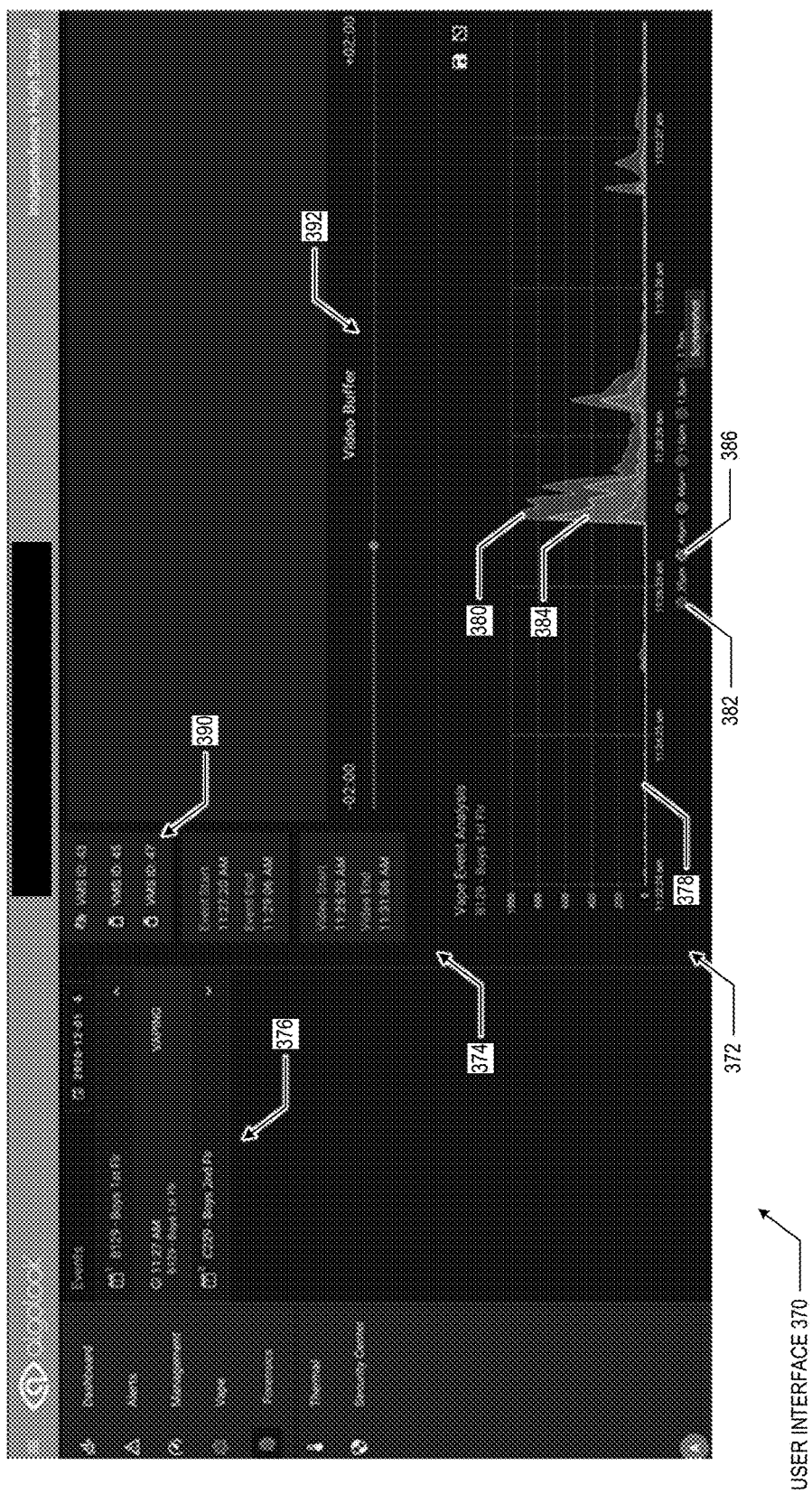
Figure 4A:
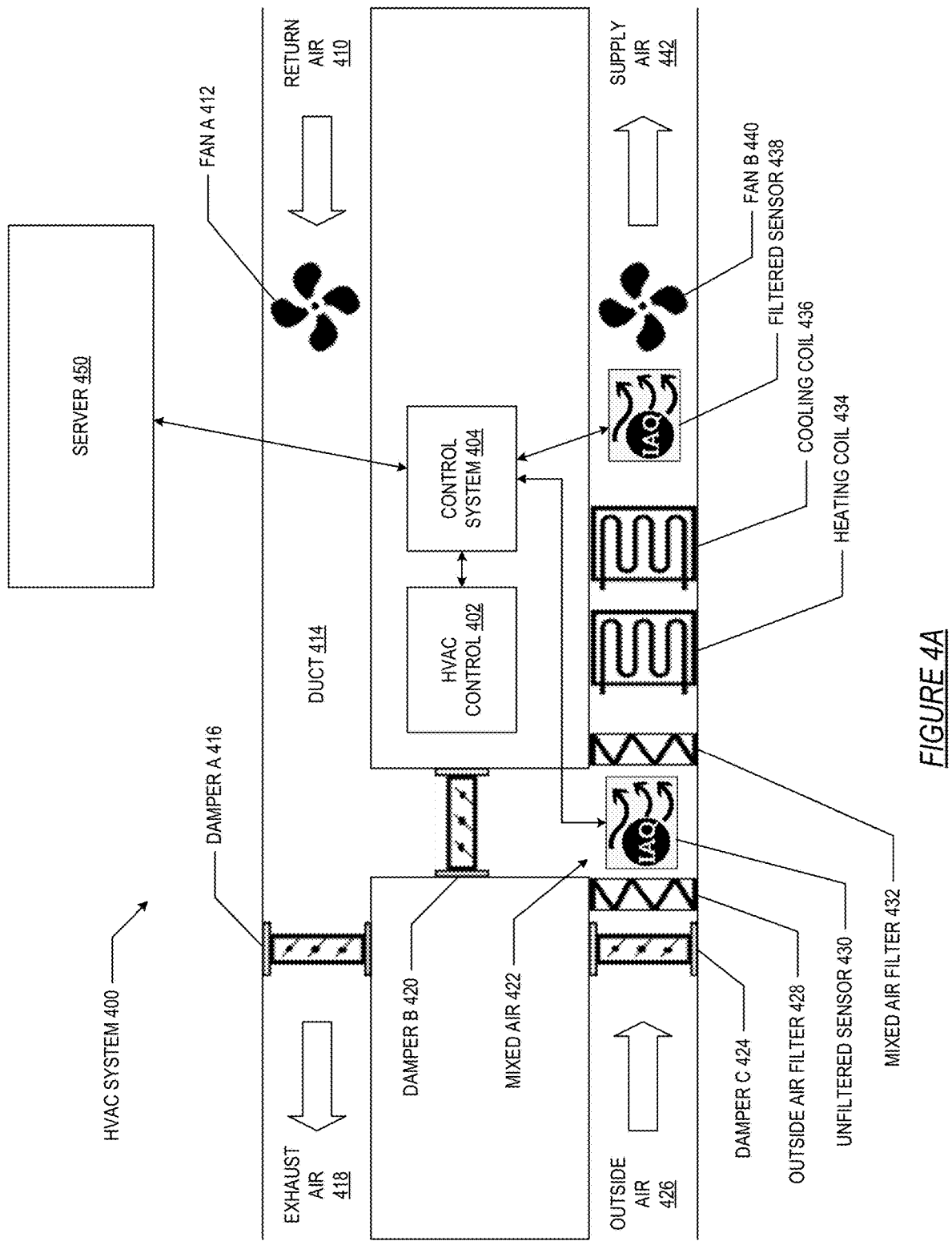
Figure 4B:
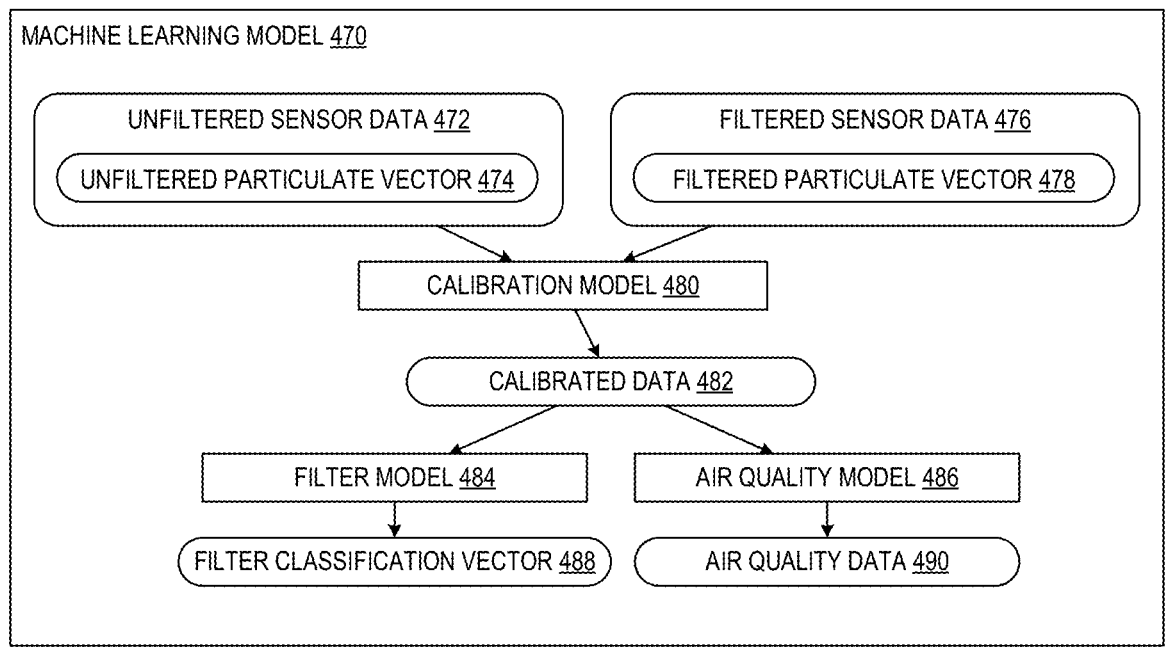

FIGS. 3A, 3B, 3C, 4A, and 4B show examples of systems that classify air particulate data. FIGS. 3A, 3B, and 3C show examples of a system that detects types of aerosols using machine learning models in accordance with the disclosure. FIGS. 4A and 4B show examples of a system that detects filter and air quality using machine learning models in accordance with the disclosure. The embodiments shown in FIGS. 3A, 3B, 4A, and 4B may be combined and may include or be included within the features and embodiments described in the other figures of the application. The features and elements of FIGS. 3A, 3B, 4A, and 4B are, individually and as a combination, improvements to the technology of computing systems and machine learning systems. The various features, elements, widgets, components, and interfaces shown in FIGS. 3A, 3B, 4A, and 4B may be omitted, repeated, combined, and/or altered as shown. Accordingly, the scope of the present disclosure should not be considered limited to the specific arrangements shown in FIGS. 3A, 3B, 3C, 4A, and 4B.

Turning to FIG. 3A, the environmental space (300) is monitored for the use of aerosol products, including vape aerosols and electronic cigarettes. The control system (304) with the air sensor system (302) are installed in the environmental space (300). The control system through four is connected to the server (306), which may be a wired or wireless connection. As an example, the control system (304) and the air sensor system (302) may be installed on a wall out of reach from the people using the environmental space (300) and an Ethernet connection may connect the control system (304) to the server (306).

The vaporizer (310) may be used by person within the environmental space (300) to expel the aerosol (312), which may be a particular type and brand of vape juice. The aerosol (312) disperses into the air of the environmental space (300) and into the air sensor system (302). The air sensor system (302) generates the air sensor data (352) (of FIG. 3B) that includes the particulate vector (354), which includes values for measurements of particulate matter from the aerosol (312).

In one embodiment, the aerosol detection model (356) (of FIG. 3B) executes on the air sensor system (302) and the results are transmitted to the control system (304). The control system (304) may aggregate periodic results from the air sensor system (302) and transmit the aggregated results to the server (306) as a notification. The server (306) may generate and transmit notifications based on the aggregated results.

In one embodiment, the control system (304) transmits a notification to the server (306) in response to the aerosol classification vector (358) (of FIG. 3B) identifying a particular type of the aerosol (312). The server (306) may retransmit the notification from the control system (304).

Turning to FIG. 3B, the machine learning model (350) may be executed by one or more of the server (306), the control system (304), and the air sensor system (302) to identify the type of the aerosol (312) (of FIG. 3A). In one embodiment, the air sensor system (302) gathers the air sensor data (352) (which includes the particulate vector (354)), the control system (304) generates the aerosol classification vector (358) from the air sensor data (352). Using the aerosol detection model (356), and the server (306) identifies the type of the aerosol (312) using the aerosol classification vector (358).

The machine learning model (350) generates the aerosol classification vector (358) from the air sensor data (352) using the aerosol detection model (356). The aerosol detection model (356) may be a neural network model, a random forest model, etc. The aerosol detection model (356) may be trained by the server (306) (of FIG. 3A) and execute on the air sensor system (302), the control system (304), or the server (306).

In one embodiment, exponential smoothing may be used. Exponential smoothing may be used to compare and adjust present air sensor data with historical air sensor data.

In one embodiment, the aerosol classification vector (358) may include categories for "VAPE" and "CLEANAIR". The frequency and duration of "VAPE" predictions may be used by the machine learning model (350) as inputs to predict the type of vape.

In one embodiment, the aerosol classification vector (358) may include categories for "CLEANAIR", "VAPE", "VAPE_TANK", and "VAPE_OTHER". When the machine learning model (350) continuously predicts the category of "VAPE" (e.g., when 80% or more of the predictions over the last 5 minutes are "VAPE"), then the prediction may be upgraded to the category of "VAPE_TANK". The predictions may further be upgraded to "VAPE_OTHER", after being upgraded to the category of "VAPE_TANK", when the machine learning model (350) continues to predict "VAPE" (e.g., for the next 5 minutes, 80% or more of the predictions continue to be "VAPE").

Turning to FIG. 3C, the user interface (370) displays air sensor data that is received and presented by a server application to a user device. The user interface (370) may be displayed on a user device as part of a web browser or native application. The user interface (370) includes multiple user interface elements to display the air sensor data and view related video. The user interface (370) includes the analysis section (372), the video section (374), and the selection section (376).

The selection section (376) displays a listing of vape sensors that are connected to the system. Selection of one of the sensors updates the analysis section (372) to display information from the selected vape sensor.

The analysis section (372) displays the timeline (378) of vape events identified by the system. A vape event indicates that a notification was received that indicates that an air sensor has detected the presence of particulate matter that is characteristic of a vape aerosol. For example, a machine learning model may return a categorization of "VAPE" that is provided in a notification sent to a server application which records the notification as the event.

The timeline (378) shows the amount of particulates for different particulate sizes as a function of time. For example, the curve (380), in the timeline (378), corresponds to the values for 0.35 micrometer particulates and corresponds to the legend item (382). The curve (384) corresponds to the values for 0.45 micrometer particulates and corresponds to the legend item (386).

The curves and legend items may be color coded. For example the curve (380) and the legend item (382) may be colored blue and the curve (384) and the legend item (386) maybe colored green.

The video section (374) provides user interface elements to select the video devices connected to the system and to view the video from the video devices around the time of the vape events detected by the system. A video device (e.g., a video camera) may be selected from the device selection section (390). Playback of the video from the selected device may be controlled with the scrub bar (392). In one embodiment, clicking on a particular time on the timeline (378) Of the analysis section (372) loads the video from the selected video device into the video section (374) for the particular time selected from the timeline (378).

Turning to FIG. 4A, The HVAC (heating ventilation an air conditioning) system (400) is controlled by the HVAC control (402) in conjunction with the control system (404).

The return air (410) flows in past the fan A (412) through the duct (414). The damper A (416) controls how much of the return air (410) close out of the duct (414) as the exhaust air (418). The damper B (420) controls how much of the return air (410) flows into the mixed air (422). The damper C (424) controls how much of the outside air (426) flows into the mixed air (422). The outside air filter (428) filters the outside air (426). The unfiltered sensor (430) is positioned to measure the mixed air (422) before flowing through the mixed air filter (432).

After passing the unfiltered sensor (430) and the mixed air filter (432), the mixed air (422) flows past the heating coil (434) and the cooling coil (436). After passing the heating coil (434) and the cooling coil (436), the mixed air (422) flows past the filtered sensor (438) and then the fan B (440) to form the supply air (442).

The unfiltered sensor (430) generates the unfiltered sensor data (472) (of FIG. 4B). The filtered sensor (438) generates the filtered sensor data (476) (of the FIG. 4B). Data from the unfiltered sensor (430) and the filtered sensor (438) is transmitted to the control system (404) and may be transmitted to the server (450). The control system (404) may generate notifications based on the data from the unfiltered sensor (430) and the filtered sensor (438). The server (450) may also generate notifications based on data from the control system (404), the unfiltered sensor (430), and the filtered sensor (438).

The HVAC control (402) may adjust the positions of the dampers A (416), B (420), and C (424) and adjust the speeds of the fans A (412) and B (440) using the prediction results from the machine learning models. For example, the notification from the control system (404) may indicate $C_{IAQ}$ index is 75 (bad indoor air quality) and the control system (404) instructs the HVAC control (402) to open the dampers C (424) and A (416), close damper B (420), and increase the speed of the fans A (412) and B (440) to allow venting of the dwelling.

Turning to FIG. 4B, the machine learning model (470) processes the unfiltered sensor data (472) and the filtered sensor data (476). The machine learning model (470) may execute on one or more of the server (450) (of FIG. 4A), the control system (404) (of FIG. 4A), the unfiltered sensor (430) (of FIG. 4A), and the filtered sensor (438) (of FIG. 4A). In one embodiment, the machine learning models of the machine learning model application (470) are trained by the server (450) (of the FIG. 4A) and are deployed to execute on the control system (404).

The machine learning model (470) receives the unfiltered sensor data (472) (which includes the unfiltered particulate vector (474)) and the filtered sensor data (476) (which includes the filtered particulate vector (478)). The machine learning model (470) generates the calibrated data (482) from the unfiltered sensor data (472) and the filtered sensor data (476) using the calibration model (480).

The machine learning model (470) generates the filtered classification vector (488) and from the calibrated data (482) using the filter model (484) and generates the air quality data (490) from the calibrated data (482) using the air quality model (486).

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIG. 5A and FIG. 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A-B), and the status flags may be read to determine if the result is positive (i.e., if A>B, then A-B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving air sensor data from an air sensor, wherein the air sensor data comprises a particulate vector;
generating a machine learning model output from the air sensor data using a machine learning model, wherein the machine learning model output comprises one or more of a filter classification vector and air quality data and is generated using a processor that:
generates calibrated data from filtered sensor data and unfiltered sensor data to a calibration model, of the machine learning model, to output the calibrated data,
generates the filter classification vector from the calibrated data using a filter model of the machine learning model, and
generates the air quality data from the calibrated data using an air quality model of the machine learning model; and
transmitting, by a control system, a notification to a heating, ventilation, and air conditioning (HVAC) control to adjust settings for at least one of a damper, a fan, or combinations thereof, using the machine learning model output.

2. The method of claim 1, further comprising:
training the machine learning model to generate the machine learning model output from the air sensor data using training data and an update function of the machine learning model.

3. The method of claim 1, further comprising:
periodically receiving, by a server application from the control system, the air sensor data and the machine learning model output.

4. The method of claim 1, wherein the air sensor data comprises temperature data, humidity data, pressure data, particulate matter data, and molecular compound data.

5. The method of claim 1, wherein generating the machine learning model output further comprises:
generating an aerosol classification vector as the machine learning model output using an aerosol detection model as the machine learning model.

6. The method of claim 5, wherein the aerosol classification vector comprises a vector of prediction confidence scores for a set of aerosol identifiers.

7. The method of claim 5, further comprising:
training the aerosol detection model to generate the aerosol classification vector from the air sensor data using training data and an update function of the aerosol detection model.

8. The method of claim 5, further comprising:
transmitting, by an air sensor system comprising the air sensor that generated the air sensor data, the aerosol classification vector to the control system; and
transmitting, by the control system, an aerosol detection notification as the notification in response to receiving the aerosol classification vector from the air sensor system.

9. The method of claim 1, further comprising:
receiving the filtered sensor data from a filtered sensor positioned after an air filter, wherein the air sensor is an unfiltered sensor positioned before the air filter and the air sensor data is the unfiltered sensor data.

10. The method of claim 9, further comprising:
wherein the filter classification vector comprises a vector of prediction confidence scores for a set of filter exhaustion levels, and
wherein the air quality data comprises an air quality index value mapped to a plurality of strings describing air quality based on the air quality index value.

11. The method of claim 9, further comprising:
training the calibration model to generate the calibrated data using training data and an update function for the calibration model;
training the filter model to generate the filter classification vector using the training data and an update function for the filter model; and
training the air quality model to generate the air quality data using the training data and an update function for the air quality model.

12. The method of claim 9, further comprising:
transmitting, by a filtered sensor system comprising the filtered sensor, the filtered sensor data to the control system;
transmitting, by an unfiltered sensor system comprising the unfiltered sensor, the unfiltered sensor data to the control system;
transmitting, by the control system to a heating, ventilation, and air conditioning (HVAC) control, a filter quality notification as the notification responsive to the filter classification vector; and
transmitting, by the control system to the HVAC control, an air quality notification responsive to the air quality data.

13. A system comprising:
a control system comprising one or more processors and one or more memories;
a control application, executing on the one or more processors of the control system, wherein the control application:
receives air sensor data from an air sensor, wherein the air sensor data comprises a particulate vector;
generates a machine learning model output from the air sensor data using a machine learning model, wherein the machine learning model output comprises one or more of a filter classification vector and air quality data and is generated using the one or more processors of the control system to:
generate calibrated data using a processor that inputs filtered sensor data and unfiltered sensor data to a calibration model, of the machine learning model, to output the calibrated data,
generate the filter classification vector from the calibrated data using a filter model of the machine learning model, and
generate the air quality data generated from the calibrated data using an air quality model of the machine learning model; and
transmits, by the control system, a notification to a heating, ventilation, and air conditioning (HVAC) control to adjust settings for at least one of a damper, a fan, or combinations thereof, using the machine learning model output.

14. The system of claim 13, further comprising:
a server comprising one or more processors and one or more memories; and
a server application, executing on the one or more processors of the server, wherein the server application:
trains the machine learning model to generate the machine learning model output from the air sensor data using training data and an update function of the machine learning model.

15. The system of claim 13, further comprising:
a server comprising one or more processors and one or more memories; and
a server application, executing on the one or more processors of the server, wherein the server application:
periodically receives, by the server application from the control system, the air sensor data and the machine learning model output.

16. The system of claim 13, wherein the air sensor data comprises temperature data, humidity data, pressure data, particulate matter data, and molecular compound data.

17. The system of claim 13, wherein the control application further:
generates generating an aerosol classification vector as the machine learning model output using an aerosol detection model as the machine learning model.

18. The system of claim 17, wherein the aerosol classification vector comprises a vector of prediction confidence scores for a set of aerosol identifiers.

19. The system of claim 15, wherein the control application further:
receives the filtered sensor data from a filtered sensor positioned after an air filter, wherein the air sensor is an unfiltered sensor positioned before the air filter and the air sensor data is the unfiltered sensor data.

20. A method comprising:
training a machine learning model to generate a machine learning model output from air sensor data using training data and an update function of the machine learning model;
receiving the air sensor data from an air sensor, wherein the air sensor data comprises a particulate vector; and
generating the machine learning model output from the air sensor data using the machine learning model, wherein the machine learning model output comprises one or more of a filter classification vector and air quality data and is generated using a processor that:
generates calibrated data from filtered sensor data and unfiltered sensor data to a calibration model, of the machine learning model, to output the calibrated data,
generates the filter classification vector from the calibrated data using a filter model of the machine learning model, and
generates the air quality data from the calibrated data using an air quality model of the machine learning model; and
transmitting a notification to a heating, ventilation, and air conditioning (HVAC) control to adjust settings for at least one of a damper, a fan, or combinations thereof, using the machine learning model output.

* * * * *